United States Patent [19]

Brown

[11] Patent Number: 5,534,095
[45] Date of Patent: Jul. 9, 1996

[54] TWO LAYERED COMPOSITE EMBOSSED BOARD

[75] Inventor: David S. Brown, Lancaster, Pa.

[73] Assignee: Armstrong World Industries, Inc., Lancaster, Pa.

[21] Appl. No.: 408,938

[22] Filed: Mar. 23, 1995

Related U.S. Application Data

[62] Division of Ser. No. 291,855, Aug. 17, 1994, Pat. No. 5,441,792.

[51] Int. Cl.$^6$ ................................................. B44C 1/24
[52] U.S. Cl. .................... 156/209; 156/219; 156/220; 427/198; 427/273; 427/277; 427/278; 427/366; 427/370; 264/293
[58] Field of Search ................... 156/71, 209, 39, 156/45, 219, 220, 284; 427/271, 273, 274, 277, 278, 359, 366, 375, 198, 370; 264/293

[56] References Cited

U.S. PATENT DOCUMENTS

| | | | |
|---|---|---|---|
| 1,353,621 | 9/1920 | Ashenhurst | 427/277 |
| 4,073,230 | 2/1978 | Akerson | 101/32 |
| 4,353,949 | 10/1982 | Kyminas et al. | 427/278 X |
| 4,778,547 | 10/1988 | Becker et al. | 156/252 X |
| 4,942,003 | 7/1990 | Bold | 156/39 X |
| 5,051,273 | 9/1991 | Maeda et al. | 427/198 X |

FOREIGN PATENT DOCUMENTS

| | | | |
|---|---|---|---|
| 51-25252 | 7/1976 | Japan | 427/277 |
| 1701525 | 12/1991 | U.S.S.R. | 427/359 |

*Primary Examiner*—Mark A. Osele

[57] ABSTRACT

This invention relates to mineral fiberboard products which are embossed to provide a decorative surface. In the invention herein a layered structure is formed before the embossing process that consists of the currently used mineral fiberboard on the bottom with an additional layer of a granulated fines material on the board surface. When embossed using the current process, the resulting composite board provides higher fidelity images than the unlayered embossed board.

2 Claims, 1 Drawing Sheet

TWO LAYERED COMPOSITE EMBOSSED BOARD

CROSS-REFERENCE TO RELATED APPLICATION

This is a divisional of application Ser. No. 291,855 now U.S. Pat. No. 5,441,792, filed Aug. 17, 1994.

BACKGROUND OF THE INVENTION

1. Field of the Invention

The invention is directed to a ceiling board and, more particularly, to a two layered composite ceiling board.

2. Description of the Prior Art

Embossed ceiling products are being manufactured to add design features to those products. Wet formed mineral fiberboard is one type of board being used to put an embossed image on a ceiling product. One method of embossing these images is by placing the board in a hot press under pressure and a dwell period. The resulting products have some restrictions in the images that can be reproduced in the mineral fiberboard because of tears in the board surface created in the embossing process.

Currently, there is a manufacturing process for embossed mineral fiberboard using a flat bed hot press. The patterns used in this process are designed so that the amount of tearing of the fiber structure is minimized. During the embossing process, the fiber structure of the board while being pressed is also being stretched and pulled apart especially if the images are at sharp angles. Even some of the present patterns being embossed have some small tears which require additional paint that causes some loss in the fidelity of the image. One objective of this invention is to reduce the pattern restrictions due to tears in the board surface. Another objective is eliminating the smaller cracks leaving a smooth clean surface which requires less paint and improves the fidelity of the image.

SUMMARY OF THE INVENTION

This invention uses a granulated fine powdered or particulate material which is laid up on the surface of a base board made of currently used board material. During the embossing process, the particulate material is more easily compressed and formed than the fibrous base board. The resulting composite board has a significantly improved image of the embossed pattern, reduced edge tears, and required less paint to finish the product.

DESCRIPTION OF THE INVENTION

This invention relates to an embossed mineral fiberboard 1 which is comprised of two layers, the bottom layer 2 being comprised of a conventional mineral fiberboard and the top layer 3 comprised of a granular powder. The powder composition is similar to the board composition. Typical ingredients would be mineral fiber, starch, newsprint and perlite. The bottom layer mineral fiberboard used was at a board density of about 0.90 to 1.05 pounds per board foot (pbf). The board surface was made wet by spraying water at a rate of approximately 10 grams per square foot (gsf). The wet board was passed under a rotating 30 mesh screen (hole size—0.0232") that had a blade in it to cause the granular mixture to be "dusted" onto the wet surface. The powder was applied at a rate of 50 gsf which increased the total composite board density about 0.15 pbf over the base board. A typical base board formulation is:

| Ingredient | % by Weight |
|---|---|
| mineral wool | 15.27 |
| newsprint | 18.63 |
| perlite filler | 36.74 |
| starch binder | 6.23 |
| polymer* | 0.04 |
| broke** | 23.09 |
| | 100.00 |

*a typical polymer used as a flocculating agent is cationic copolymer of acrylamide and quaternized comonomer
**broke is crushed recycled ceiling board or sanding dust from sanding newly formed boards used as a filler

| Ingredient | % by Weight |
|---|---|
| sanding dust | 90.00 |
| starch binder | 10.00 |
| | 100.00 |

Perlite may be used in lieu of sanding dust. There was approximately 3/8" of powder on the board surface. The powder layer can be about 0.25" to 0.5" thick. The powder coated surface was sprayed with water at approximately 10 gsf. It was important that the air pressure on the water spray was reduced to give a light mist so that the powder coating was not blown off the surface.

Figure 4:
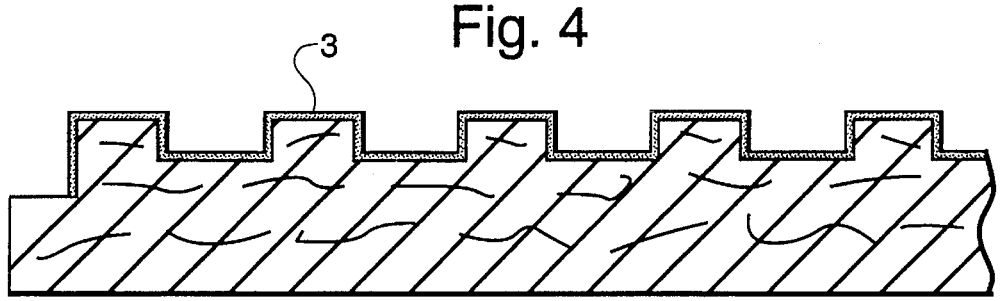
FIG. 4 is a cross-section of an embossed design on a two layered composite board.

At this point, the board was ready to be embossed. Top and bottom platens of the embossing press were set at 550° to 60020 F. The 0.800" board with approximately 0.375" of powder was compressed to 0.700" at its point of maximum thickness. The base board prior to compression has a density of about 0.90 to 1.05 pbf with a powder layer of about 0.375". After compression the maximum composite board thickness is 0.700" with the base board 2 being compressed 0.350" maximum and the powder layer 3 being compressed to a thin dense skin layer of several mils thickness. The board density is increased about 0.16 pbf. As shown in FIG. 4 some areas of the composite board surface could be embossed an additional 0.045" to 0.060" to form a design in the board surface. The embossing design is in the powder layer and through the powder layer and into the bottom layer. If no embossed design is used and just a flat surface is desired, compression provides a thin dense skin layer that provides a flat smooth surface. Dwell time in the press was 30 to 40 seconds to drive off excess water. After the embossing process, the composite board was finish painted using conventional prime, intermediate and finish paint coats for mineral fiber ceiling board. As the powder layer changes from 0.250" to 0.375" to 0.500" in thickness prior to compression, its compressed state changes to about 0.10" to 0.15" to 0.20" in thickness after compression.

Some boards were embossed with a smooth plate to evaluate some physical properties. The two layer composite board had a smoother and harder surface than the control mineral fiberboard of the conventional one layer structure. Hardness is measured by testing for indent. Indent is measured by using the indentation machine which has a 1" diameter ball foot with a thirty pound load. The ball foot rests on the board surface for one minute and is then removed therefrom. Test results are the measurement distance of the indent depth in the board surface to the surface of the board. This measures hardness of the surface.

The results of the test are:

| Indent | |
|---|---|
| Control* | .084" |
| Dust @ 20 gsf | .068" |
| Dust @ 50 gsf | .055" |
| Dust @ 50 gsf | .057" |

*The Control is the conventional one layer board structure. It can be seen that indent resistance improved by about 20% to 33%.

It is necessary to consider other physical characteristics of a ceiling board when the structure of the board is changed. Flexural strength and sag resistance must be maintained.

The MOR (modulus of rupture) Test is a testing method used to measure the flexural strength of rigid or semi-rigid material with center point loading. The test is done by taking three samples of the material, 3"×12" size, for each direction (MD-machine direction, AMD-across machine direction). The samples are supported across the 3" direction at two points to provide a 10" spacing between support points. At the midpoint of the 10" spacing, a ¼" bar extends across the 3" direction. The bar presses on the sample with increasing pressure until the sample breaks.

The MOR chart below shows that this embossing process does not reduce the board strength, but shows improvement over the board without powder. The data is the average of three test samples.

| | Average MOR (psi) | | |
|---|---|---|---|
| POWDER | None Control | 20 gsf Unpainted | 50 gsf Unpainted |
| Face Down - MD | 210 | 215 | 231 |
| Face Down - AMD | 212 | 230 | 226 |

Face Down MOR improved 5 to 21 psi

The sag on the painted composition board had less movement than the control board. The Sag Test purpose is to determine the effects of humidity, temperature and gravity on the deformation characteristics of the ceiling materials in an installation position. Center point deflection is measured initially and after each segment of the test cycle.

Test results show the amount of movement in the board when the humidity level increases from initial room conditions of ambient RH of about 65% RH to 90% RH then decreases to 35% RH.

The following chart shows the composite board had less movement in the face down direction than the control board in the humidity cycle at 82 degrees F. Both boards had good sag properties for the type of material tested but the composite board had less sag.

| SAG TEST (mils) | | | | |
|---|---|---|---|---|
| | | Initial | 90% RH | 35% RH |
| Composite Board | Face Down | −17 | −25 | −9 |
| Control Board | Face Down | −21 | −54 | −60 |

Figure 1:
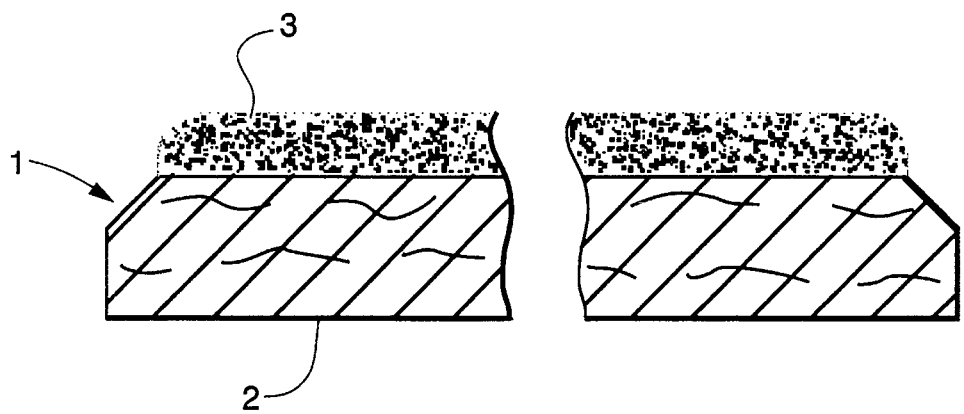
FIG. 1 is a cross-section of the composite board before compression.
Figure 2:
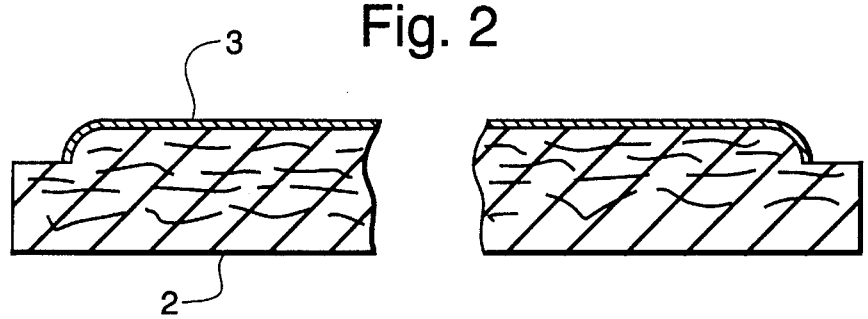
FIG. 2 is a cross-section of the composite board after compression.
Figure 3:
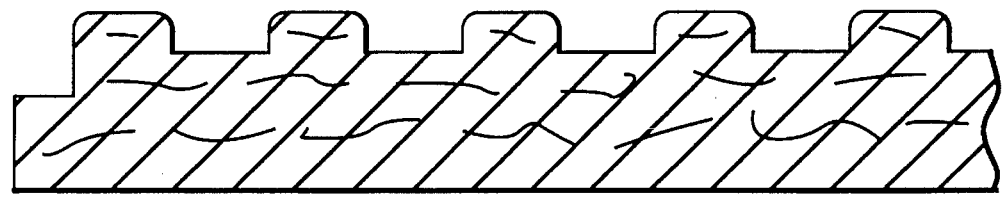
FIG. 3 is a cross-section of an embossed design on conventional board.

Composite boards embossed with various patterns gave more detailed reproduction of the designs and reduced edge tears than the control mineral fiberboard. FIG. 3 shows an embossed control board with no powder layer and FIG. 4 is an embossed board with powder layer 3.

What is claimed is:

1. The method of forming an embossed composite two layer ceiling board comprising the steps of:
   (a) providing a base board comprising a number of ceiling board material elements with an upper surface;
   (b) placing a powder material of a formulation comprising at least one of the elements of the base board on the base board upper surface;
   (c) after step (b) wetting the powder material with water; and
   (d) forming an embossed pattern in the powder material by using heat and pressure to compact the powder layer levels to form the raised and lowered areas of the embossed pattern in the power layer and base board.

2. The method of forming a composite two layer ceiling board comprising the steps of:
   (a) providing a base board comprising a number of ceiling board material elements with an upper surface;
   (b) placing a powder material of a formulation comprising at least one of the elements of the base board on the base board upper surface;
   (c) after step (b) wetting the powder material with water; and
   (d) forming a flat smooth surface in the powder material by using heat and pressure to compact the powder layer.

* * * * *